United States Patent [19]

Nicolas et al.

[11] Patent Number: 4,493,022
[45] Date of Patent: Jan. 8, 1985

[54] CENTRALIZED ARBITRATION PROCESS AND CENTRALIZED ARBITER FOR MULTIPROCESSOR SYSTEM

[75] Inventors: Alain Nicolas; Jean-Pierre Chapelain, both of Colombes, France

[73] Assignee: Thomson-CSF Telephone, Paris, France

[21] Appl. No.: 260,108

[22] Filed: May 4, 1981

[30] Foreign Application Priority Data

May 6, 1980 [FR] France .................. 80 10086

[51] Int. Cl.³ .................................. G06F 15/16
[52] U.S. Cl. ................................... 364/200
[58] Field of Search ... 364/200 MS File, 900 MS File

[56] References Cited

U.S. PATENT DOCUMENTS

| | | | |
|---|---|---|---|
| 3,353,160 | 1/1967 | Lindquist | 340/172.5 |
| 3,633,163 | 1/1972 | Birchmeier | 340/147 |
| 3,905,023 | 9/1975 | Perpigila | 364/200 |
| 4,320,457 | 3/1982 | Tanikawa | 364/200 |
| 4,334,288 | 6/1982 | Booker | 364/900 |
| 4,363,096 | 12/1982 | Comfort et al. | 364/200 |
| 4,395,753 | 7/1983 | Comfort et al. | 364/200 |
| 4,412,281 | 10/1983 | Works | 364/200 |

OTHER PUBLICATIONS

Pearce, et al., "Asynchronous Arbiter Module", IEEE Transactions on Computers, Sep. 1975, pp. 931–932.
Brandwajn et al., "Communication in the Fast Universe of ARCADE, A Loosely-Coupled Adaptive Multiprocessor System", Large Scale Integration, (Lawson et al., ed.), 1978, pp. 281–289.

Primary Examiner—Gareth D. Shaw
Assistant Examiner—Ronni S. Malamud
Attorney, Agent, or Firm—Oblon, Fisher, Spivak, McClelland & Maier

[57] ABSTRACT

An arbiter cooperating with p.n processing units grouped into p levels each comprising n processing units. An elementary arbiter is assigned to each level, and a central arbiter attributes cyclically the priority to each level. The central arbiter comprises essentially a memory programmed for attributing a single priority to each level.

8 Claims, 2 Drawing Figures

CENTRALIZED ARBITRATION PROCESS AND CENTRALIZED ARBITER FOR MULTIPROCESSOR SYSTEM

BACKGROUND OF THE INVENTION

1. Field of the Invention

The present invention relates to a centralized arbitration process, as well as a centralized arbiter for a multiprocessor system.

2. Description of the Prior Art

There is known from the article on pages 154 to 158 of the April issue 1978 of the review "Computer Design" an arbitration device for a multiprocessor system comprising several identical processing units, all connected to the same bus. This known arbiter, of a synchronous type, enables a rotator priority between the different processing units to be established so that none of them monopolizes the bus, and so that the processing achieved by the multiprocessor system is as rapid as possible. The known arbiter comprises essentially a ROM (read-out memory) in which are programmed all the possible configurations of requests for reservation of the bus and of corresponding states.

The size of this ROM depends on the number of processing units cooperating therewith. If the number of processing units is not very high, the capacity of the ROM required for forming the arbiter is correlatively low, and the arbiter is then inexpensive and easy to produce. On the contrary, if the number of processing units is high, several memories must be used, and the constructon of the arbiter becomes complex and expensive.

SUMMARY OF THE INVENTION

The present invention has as its object an arbitration process for several processing units permitting simple and rapid determination of the priorities, as well as an arbiter device for implementing this process, this device being as compact and as inexpensive as possible, and the simplest possible to construct.

The arbitration process in accordance with the present invention consists in dividing the processing units up into several groups or "levels" each comprising, preferably, the same number of processing units, in attributing in accordance with a main cycle to each of these levels on or more priorities, and in attributing in accordance with seconndary cycles, one or more priorities to each of the processng units within each level.

According to a preferred aspect of the process of the present invention, there is attributed, for the main cycle, a single priority to each of the levels, and this in a given order, fixed beforehand, and there is attributed, for the secondary cycles, in each level, a single priority to each of the processing units, and this in another given order, fixed beforehand.

According to another aspect of the process of the invention, within each level or within some of then, the processing units are divided up into several sublevels, there is attributed, in a main cycle, to each of the levels a single one or several priorities, there is attributed, in secondary cycles, a single one or several priorities to each of the sublevels and there is attributed, in tertiary cycles, a single one or several priorities to each of the processing units within each sublevel.

Another to another process of the invention, the order of the priorities of the main cyle and/or of the secondary cycles and/or of the tertiary cycles are modified during processing.

The arbiter device in accordance with the invention, cooperating with p.n. processing units, these processing units being divided up into p levels each comprising n processing units, and comprising for each level an elementary arbiter known per se whose inputs are connected to corresponding bus-request outputs of the processing units and whose outputs are connected to corresponding bus-grant inputs of these same processsng units, comprises p OR circuits each having n inputs, these n inputs being connected respectively, for each of the p OR circuits to the n bus-request outputs of the n processing units of each of the p levels, the outputs of the p OR circuits being connected, through a register, to p first inputs of a memory for attributing priorities to the levels another input of which is connected, through the same register, to all the bus busy outputs, connected together, of the p.n. processing units and whose m other inputs are connected, through the same resister, to m outputs of this memory, m being equal to the whole part, increased by a unity, of the 2-base logarithm of the number p, a validation device being placed, for each of the p levels, between the n outputs of the elementary arbiter and the corresponding bus-grant inputs of the processing units, outputs of the level priority attribution memory being each connected to a validation terminal of a corresponding validation device, and another output of said memory being connected simultaneously to all the bus-clear inputs of the p.n. processing units.

Preferably, the memory for attributing priorities to the levels is an ROM.

According to a variation of the invention, one or more of the memories of the arbiter device are random access memories (RAM) connected, in a way known per se, to a device for modifying the contents thereof.

According to yet another variation of the invention, the arbiter device comprises in each level and/or for the whole of the levels several different read-only memories connected to a selector device for selecting one of them.

BRIEF DESCRIPTION OF THE DRAWINGS

The present invention will be better understood from the detailed description of one embodiment taken as a nonlimiting example and illustrated by the accompanying drawings, in which.

DESCRIPTION OF THE PREFERRED EMBODIMENT

Figure 1:
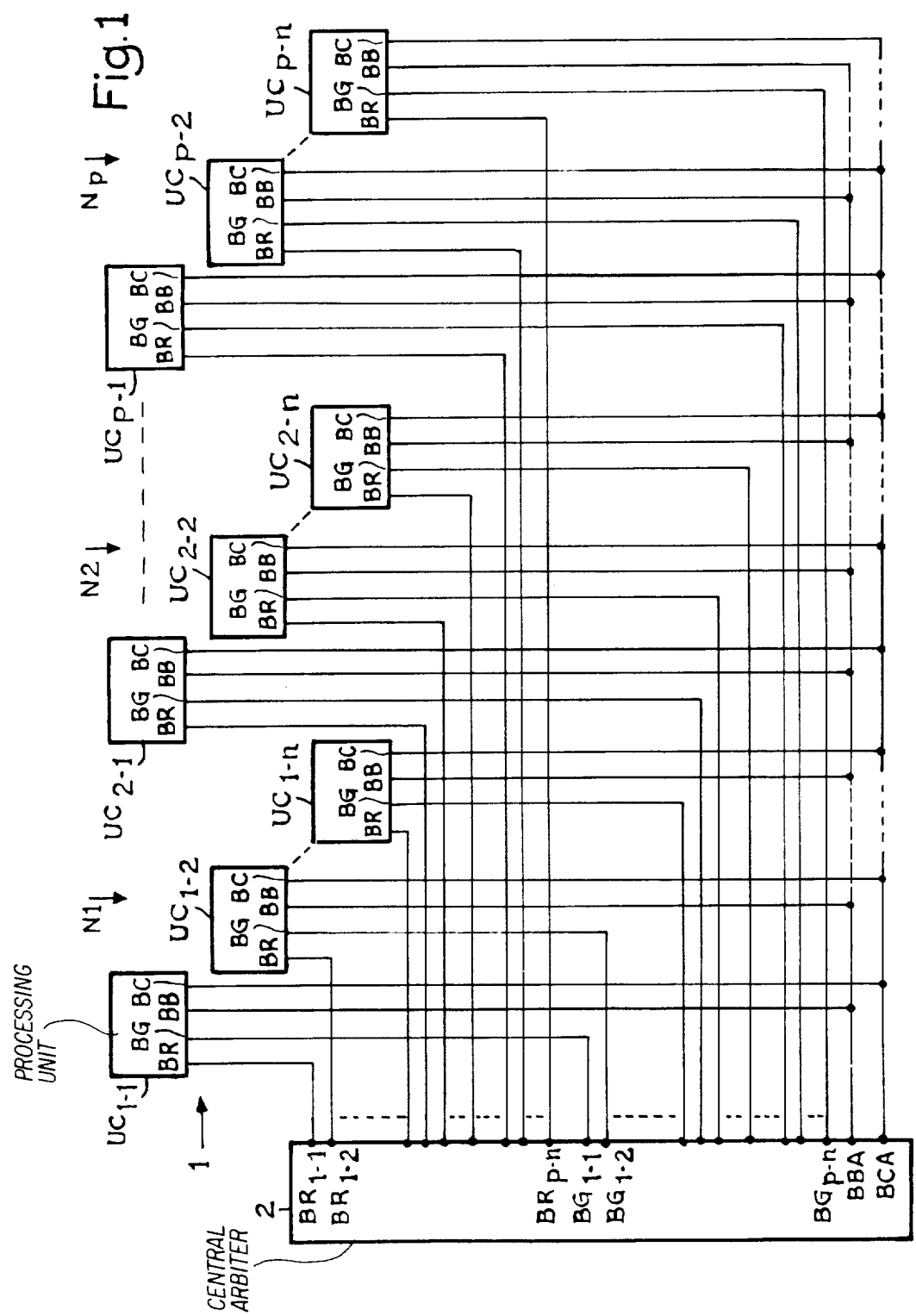
FIG. 1 is a simplified block diagram of a multiprocessor system in accordance with the present invention.

The multiprocessor system partially shown in FIG. 1 comprises an array 1 of p.n. identical processing units divided up into p levels each comprising n processing units. Preferably, if the number (p.n.) is a prefect square, p is chosen equal to n, and in the opposite case, p is chosen as close as possible to n, p being able to be greater than or less than n. In the case shown in FIG. 1, the processng units are referenced $UC_{1,1}$ to $UC_{1,n}$ for the first level, $UC_{2,1}$ to $UC_{2,n}$ for the second level and so on up to the rank level p in which the processing units are referenced $UC_{p,1}$ to $UC_{p,n}$, the rank levels 1 to p being respectively referenced N1 to Np.

Each of the processing units of array 1 comprises in particular two outputs and two inputs for connection to a centralized arbiter device 2 common to all the processing units. The two outputs are referenced BR (Bus Request) and BB (Bus Busy) and the two inputs are referenced BG (Bus Grant) and BC (Bus Clear).

The BR outputs of the processing units $UC_{1,1}$ to $UC_{p,n}$ are each connected to a corresponding input of arbiter 2, these inputs being respectively referenced $BR_{1,1}$ to $BR_{p,n}$. The BG inputs of the processing units $UC_{1,1}$ to $UC_{p,n}$ are each connected to a corresponding output of arbiter 2, these outputs being respectively referenced $BG_{1,1}$ to $BG_{p,n}$.

The BB outputs of all the processing units are connected together and to a common BBA input of arbiter 2. The BC outputs of all the processing units are connnected together and to a common BCA input of arbiter 2.

Figure 2:
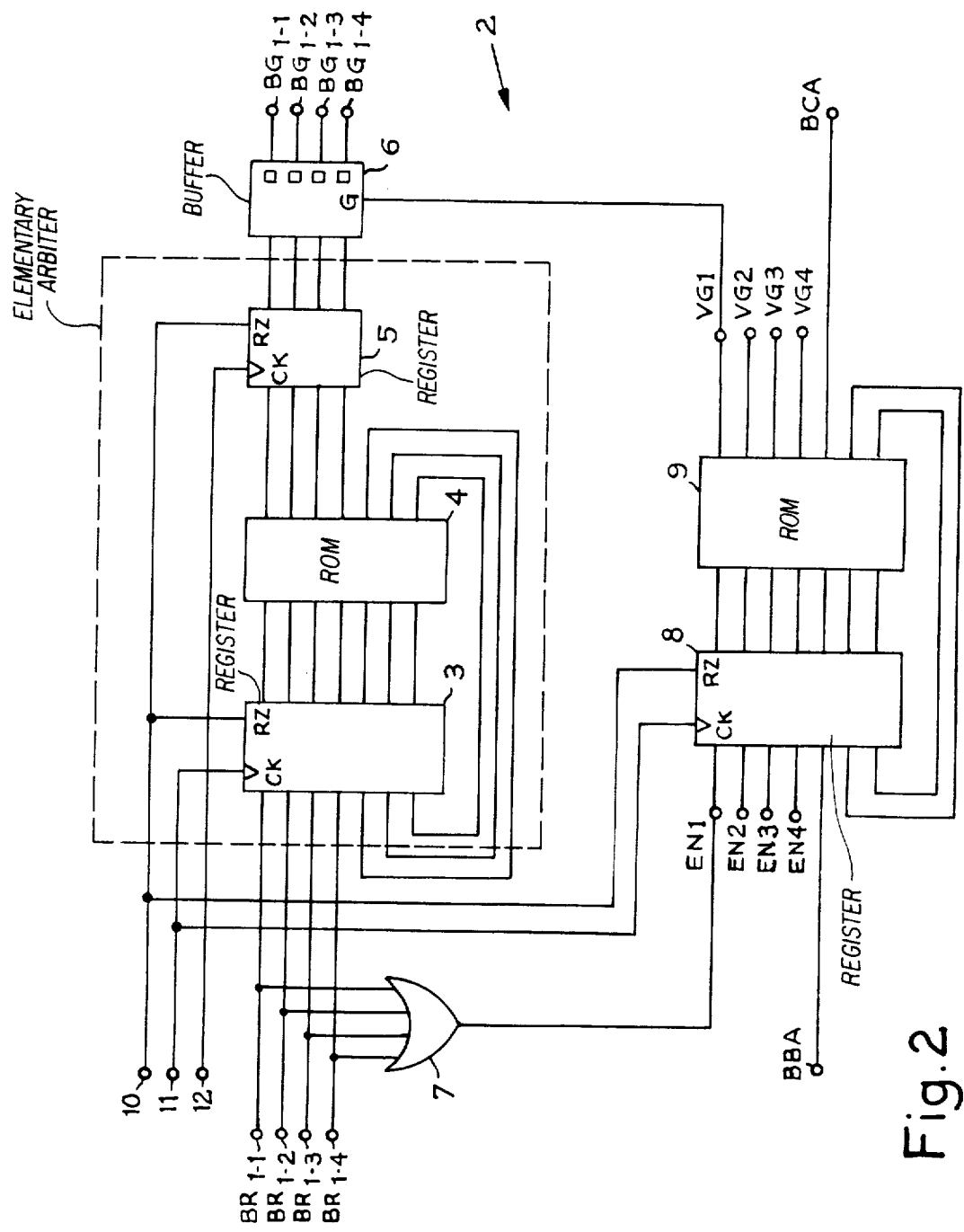
FIG. 2 is a detail diagram of the arbiter of the sytstem of FIG. 1.

There is shown partially in FIG. 2 the diagram of one embodiment of arbiter 2 in the case where the number (p.n) of processing units is 16, in whichcase $p = n = 4$. For the sake of simplicity in the drawing, only the inputs $BR_{1,1}$ to $BR_{1,4}$ and the outputs $BG_{1,1}$ to $BG_{1,4}$ relative to input 1 have been shown, the circuit such as circuit 3 to 6 connecting these inputs to these outputs being identical for all levels.

The four inputs $BR_{1,1}$ to $BR_{1,4}$ of arbiter 2 are connected to the first four inputs of a seven-input resister 3. The seven outputs of register 3, corresponding respectively to its seven inputs, are connected seven addressing inputs of an ROM 4. ROM 4 comprises seven outputs of which the first four are connected to the corresponding inputs of a second register 5. The three other outputs of memory 4 are connected respectively to three other inputs of register 3. The four outputs of register 5, corresponding to its four inputs, are connected to four corresponding inputs of a quadruple buffer 6 having three states. The four outputs of buffer 6, corresponding to its four inputs, are referenced $BG_{1,1}$ to $BG_{1,4}$ respectively.

The four inputs $BR_{1,1}$ to $BR_{1,4}$ are also connected to the four inputs of a reference OR circuit 7. The output of circuit 7 is connected to a terminal EN1 which is itself connected to the first input of a seven-input register 8. The three following inputs of register 8 are connected to terminals EN2 to EN4 which are themselves each connected to the output of an OR circuit (not shown), itself connected like circuit 7 to the BR inputs relative to levels 2 to 4 respectively.

Another input of register 8 is connected to an input terminal referenced BBA. The seven outputs of register 8 are connected to seven addressing inputs of a seven-output ROM 9. The first four outputs of memory 9 are connected to terminals VG1 to VG4 respectively. Terminal VG1 is connected to the validation control input G common to the four buffers forming the quadruple buffer 6. The terminals BG2 to VG4 are connected, in the same way as terminal VG1, to the terminals G of buffers (not shown), such as buffer 6, for levels 2 to 4. Another output of memory 9 is connected to an output terminal referenced BCA. The last two outputs of memory 9 are connected to the last two inputs of register 8.

The resetting inputs RZ of registers 3, 4 and 8 are connected together to a common terminal 10, itself connected to a circuit (not shown) producing a resetting pulse at switch-on of the multiprocessor system. The clock signal inputs CK of registers 3 and 8 are connected together and to a terminal 11, and the clock signal input CK of register 5 is connected to a terminal 12. Terminals 11 and 12 are connected to a suitable clock signal generator supplying signals as will be explained herebelow.

The operation of the above-described device will now be explained, after briefly recalling the operation of a known arbiter.

When one of the processing units of the multiprocessor system is to emit or recieve data through the data bus, for example in order to communicate with another processing unit, it emits a so-called "bus request" signal, for example a logic level "1", at an appropriate output, with a view to making known its intention of using the bus. If several processing units of the multiprocessor system simultaneously request use of the bus, they must be arbitrated between by attributing to them an order of priority. If the priority is always attributed to the same processing unit, and if this processing unit had a very great number of data to send or to recieve through the data bus, the other processing units could not use the bus at the right moment, for example in order to converse with the processing unit emitting or receiving, which would slow down considerably the processing speed of the multiprocessor system. To remedy this drawback, there was proposed in the above-mentioned article in "Computer Design" a centralized arbiter attributing cyclically in a fixed order the priority to each of the processing units of the system. If, at a given moment, one of the processing units occupies the bus and if at this moment one or more other processing units request use of the bus by emitting a "bus request" signal, the arbiter withdraws the priority from the processing unit busy emitting or receiving at the end of the elementary operation which it is executing and attributes, in the above-mentioned fixed order, the priority to the processing units emitting the bus request, for the execution at each time of a single elementary operation. When all these other processing units have executed their elementary operation, the priority returns to the first processing unit mentioned which executes the elementary operation folowing the one after which the priority was withdrawn from it consequent on the emission of bus request signals. Then a second cycle of elementary operations takes place, in the same above-mentioned fixed order. If meantime further processing units emit a bus request signal, the priority is granted them as soon as their turn is reached in the cycle of elementary operations in progress. Of course, the operating program of the multiprocessor system is provided so that the processing which it must carry out may be effectively carried out as soon as each of the processing units emitting a bus request has effected the minimum possible of elementary operations. Thus, the multiprocessor system carries out its processing in the minimum time.

The known multiprocessor system described above operates very satisfactorily, but the size and the price of the memory device of the arbiter become prohibitive when this system comprises a large number of processing units. Thus, if the multiprocessor system comprises for example sixteen processing units, a memory of 2M words ($2^{21}$ words) is required each of 21 bits. On the contrary, still in the case of sixteen processing units, the arbiter device of the invention, described above with reference to FIGS. 1 and 2 of the drawings, and comprising four levels off four processing units each only requires one memory of 128 words of 7 bits for each of the four levels, and a memory of 128 words of 7 bits for the arbitration of the levels, i.e. a total of five memories of 128 words of 7 bits, which, even with the thirteen registers and the four OR gates required in addition to the memories, is substantially less space-consuming and expensive than the known solution.

In the device of the invention described above, the operation of the arbiter element within each level (arbiter comprising the elements such as those referenced 3, 4 and 5) is known per se from the above-mentioned article in "Computer Design", and will not be described article in "Computer Design", and will not be described further. On the other hand, there will be described in detail with reference to FIG. 2 the operation of the arbiter element common to all levels, and common to all levels, and comprising the elements 7, 8, 9 and 6.

As soon as a bus request apears at one of the BR terminals, for example in level 1, and a clock pulse arrives at terminal 11, memory 4 is addressed to an address determined by the configuration of the signals at terminals $BR_{1,1}$ to $BR_{1,4}$, and at the last three outputs of memory 4 which represent the future state. Furthermore, said bus request produces a "1" at the output of the OR gate 7, so at the input EN1 of register 8. If no other processing unit occupies the bus, a "0" is present at terminal BBA.

The programming of memory 9 takes place similarly to that of memory 4, except that in memory 4 thereis provided between each "request" state a "waiting" state (as in the case of the above-mentioned article in "Computer Design"), which requires for this memory 4 three inputs (for the present state) and three outputs (for the future state), whereas in the case of memory 9, there is caused to correspond to four level requests, appearing at the first four inputs of memory 9, four states which are binary-coded, which only requires two bits, and in addition the state of the bus is taken into account in the following way.

When at least a "1" appears at one of the first four inputs of memory 9, if the bus is busy, i.e. if a "1" appears at the terminal BBA and is transmited to memory 9, memory 9 must produce a "1" at the terminal BCA so as to allow the processing unit occupying the bus to finish its elementary operation. If the bus is not busy, i.e. if a "0" is present at terminal BBA and is transmitted to memory 9, a "1" must apear at the corresponding VG output at the level whose state is the nearest, in the given fixed order, to that of the level to which the last user of the bus belongs. As long as a "1" is present at terminal BBA, memory 9 must remain in the state corresponding to the attribution of the bus to the processing unit which is at present master whatever the number of bus requests waiting. Memory 9 must then produce a "1" at the terminal BCA to inform the processing unit occupying the bus that it must liberate it as soon as possible, i.e. as soon as the elementary operation in progress is finished. When this operation is finished, the processing unit in question sends a "0" to terminal BBA. When the signal at terminal BBA goes again to "0", if there is no bus request waiting, memory 9 must remain in the state where it was previously. If there is a single bus request waiting, memory 9 must go over to the state associated with the corresponding level and produce a "1" at the corresponding VG output. Finally, still in the case where a "0" appears at terminal BBA, if there are several bus requests waiting, the memory 9 must go over to the state corresponding to the level request the closest to the last master of the bus and produce a "1" at the corresponding VG output. From these data, a man skilled in the art may very easily program memory 9.

As stated above, on the appearance of a bus request at one of the terminals $BR_{1,1}$ to $BR_{1,4}$, and as soon as a clock signal is applied to terminal 11, memories 4 and 9 are addressed as a function of this bus request and of the preceding state. As soon as a "0" appears at terminal BBA, the output VG1 presents a "1" which enables device 6. Immediately afterwards, a clock signal is sent ot terminal 12, and the configuration, comprising a single "1" corresponding to said bus request, of the first four outputs of memory 4 is transferred to the input of device 6. Now, since device 6 was enabled by the VG1 output, the configuration occurs at terminals $BG_{1,1}$ to $BG_{1,4}$, and the "1" of this configuration grants the priority to the processing unit requesting it.

If several bus requests appear in a level, for example level 1, and none in the other levels, the first priority is granted to the processing unit which follows, in the predetermined fixed order, that having last had the priority. Thus, for example, if in level 1, the fixed order of priorities is $UC_{1,1}$, $UC_{1,2}$, $UC_{1,3}$ and $UC_{1,4}$, if before the moment considered when bus requests appear simultaneously for the processing units $UC_{1,1}$, $UC_{1,3}$ and $UC_{1,4}$, the processing unit $UC_{1,3}$ was the last to have priority, the arbiter will grant the priority respectively to $UC_{1,4}$, $UC_{1,1}$ and $UC_{1,3}$ each time for effecting one elememtary operation. If after this secondary cycle the bus requests still exist, the arbiter proceeds with one or more further secondary cycles, and if need be modifies these cycles depending on the disappearance of some of the bus requests and/or on the appearance of further new ones. As long as bus requests exist in the level considered, a "1" appears at the VG output corresponding to this level for each clock pulse applied to terminal 11. Moreover, each transition from one priority to the next is preceding by the appearance of a "1" at the terminal BCA and followed by the appearance of a "1" at terminal BBA.

In the most general case, i.e. when several bus requests are produced by processing units belonging to different levels, the priority is attributed according to a main cycle by memory 9, at the rate of a single priority per level, and according to a secondary cycle for each of the levels by the corresponding memory 4. Thus, for example in the case of a system with sixteen processing units, if all these units emit a bus request, and assuming that memory 9 attributes the first priority to level 3, and that in each level the first priority is attributed to the second processing unit, the order of the priorities being throughout the increasing numerical order, the priorities will be granted in the following order: $UC_{3,2}$, $UC_{4,2}$, $UC_{1,2}$, $UC_{2,2}$, $UC_{3,3}$, $UC_{4,3}$, $UC_{1,3}$ ....$UC_{3,1}$, $UC_{4,1}$, $UC_{1,1}$ and $UC_{2,1}$. Of course, if bus requests continue to exist after this complete cycle of sixteen priority attributions, another complete cycle takes place, and if some of the bus requests disappear, the complete cycle is accordingly shortened without any other modification of its order. Thus, if for example the bus requests emitted by the processing units $UC_{4,3}$ and $UC_{1,3}$ disappear, the corresponding portion of the complete cycle becomes :
... $UC_{1,2}$, $UC_{2,2}$, $UC_{3,3}$, $UC_{2,3}$, $UC_{3,4}$, $UC_{4,4}$, .... It can be seen that the priority passes directly from $UC_{3,3}$ to $UC_{2,3}$, the parts of the complete cycle preceding the attribution of the priority to $UC_{3,3}$ and following the attribution of priority to $UC_{2,3}$ not being distrubed. It will be noted that the passage of the priority form $UC_{3,3}$ to $UC_{2,3}$ is as rapid as all the other passages, the passage speed depending only on the frequency of the clock signals applied to the arbiter.

What is claimed is:

1. A synchronously operated process for the centralized arbitration of a plurality of processing units in a multi-processor system wherein said processor units are divided into a plurality of levels, comprising the steps of:

generating a predetermined main timing cycle;

cyclically attributing, in accordance with said main cycle, at leasts one priority to each of said levels;

generating a plurality of predetermined secondary timing cycles witheach seconary timing cycle being associated with a corresponding one of said plurality of levels;

cyclically attributing to each of said processing units within each of said levels at least one priority in accordance with said corresponding one of said secondary cycles.

2. The process as claimed in claim 1, wherein each of the levels comprise the same number of processing units.

3. The process as claimed in any one of claims 1 or 2, wherein the order of said at least one priority attributed in accordance with one of the main cycle and the secondary cycles are modified during processing.

4. An arbiter device cooperating with p.n. processing units in a multiprocessor system,these processing units being divided up into p levels each comprising n processng units; and comprising for each level an elementary arbiter known per se whose inputs are connected to corresponding "bus request" outputs and "bus busy" outputs of the processing units and whose outputs are connected to corresponding "bus grant" inputs of these same processing units, wherein there are further provided p OR circuits each with n inputs, these inputs being connected respectively for each of the p OR circuits to the n "bus request" outputs of the n processing units of each of the p levels, the outputs of the p OR circuits being connected, through a register, to p first inputs of a memory attributing priorities to the levels another input of which is connected, through the same register, to all said "bus busy" outputs, connected together, of the p.n. processing units, and wherein m other inputs of said memory are connected, through the same register, to m outputs of said memory, m being equal to the whole part, increased by a unity, of the 2-base logarithm of the number p, a validation device being placed, for each of the p levels, between the n outputs of the elementary arbiter and the corresponding "bus grant" inputs of the processing units, p outputs of the level priority attribution memory each connected to a validation terminal of a corresponding validation device, and another output of said memory being connected simultaneously to all the "bus clear" inputs of the p.n. processing units.

5. The device as claimed in claim 4, wherein the memory for attributing priorities to the levels is a read-only memory.

6. The device as claimed in any one of claims 4 or 5 wherein said arbiter device for each level includes an arbiter memory device and wherein at least one of said arbiter memory devices is a random access memory connected to a device for modifying the contents thereof.

7. The device as claimed in any one of claims 4 or 5, comprising in at least one of the levels several different read-only memories connected at each time to a selector device for selecting one of said several different read-only memories.

8. The device as claimed in any of claims 4 or 5, wherein one or more levels are subdivided into sublevels.

* * * * *